2 Sheets--Sheet 2.
W. R. RIGHTOR.
Shoal-Indicators.
No. 157,930. Patented Dec. 22, 1874.
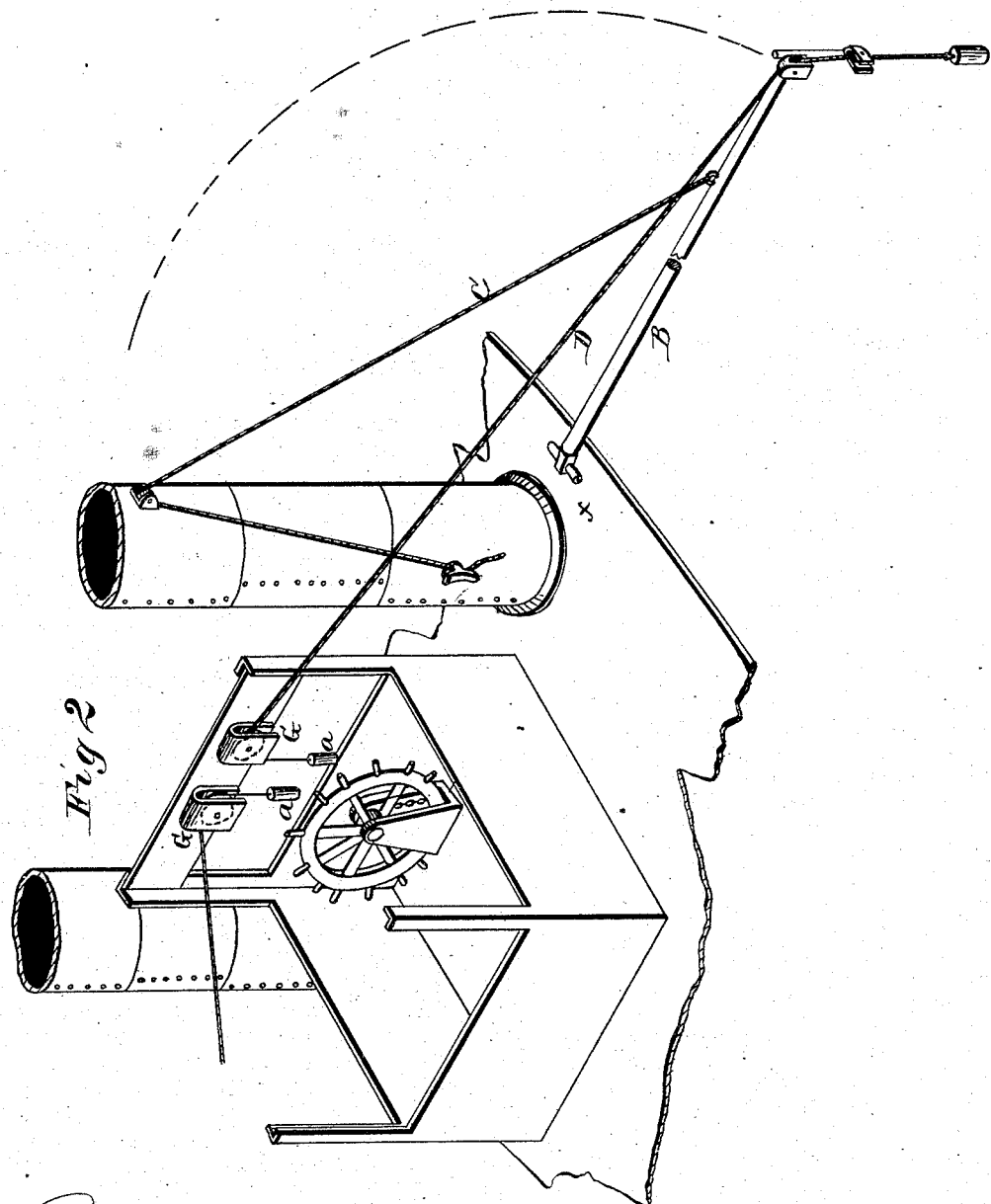
WITNESSES
Franck L. Durand
C. L. Evert
INVENTOR
W. R. Rightor.
By Alexander Mason
Attorneys.

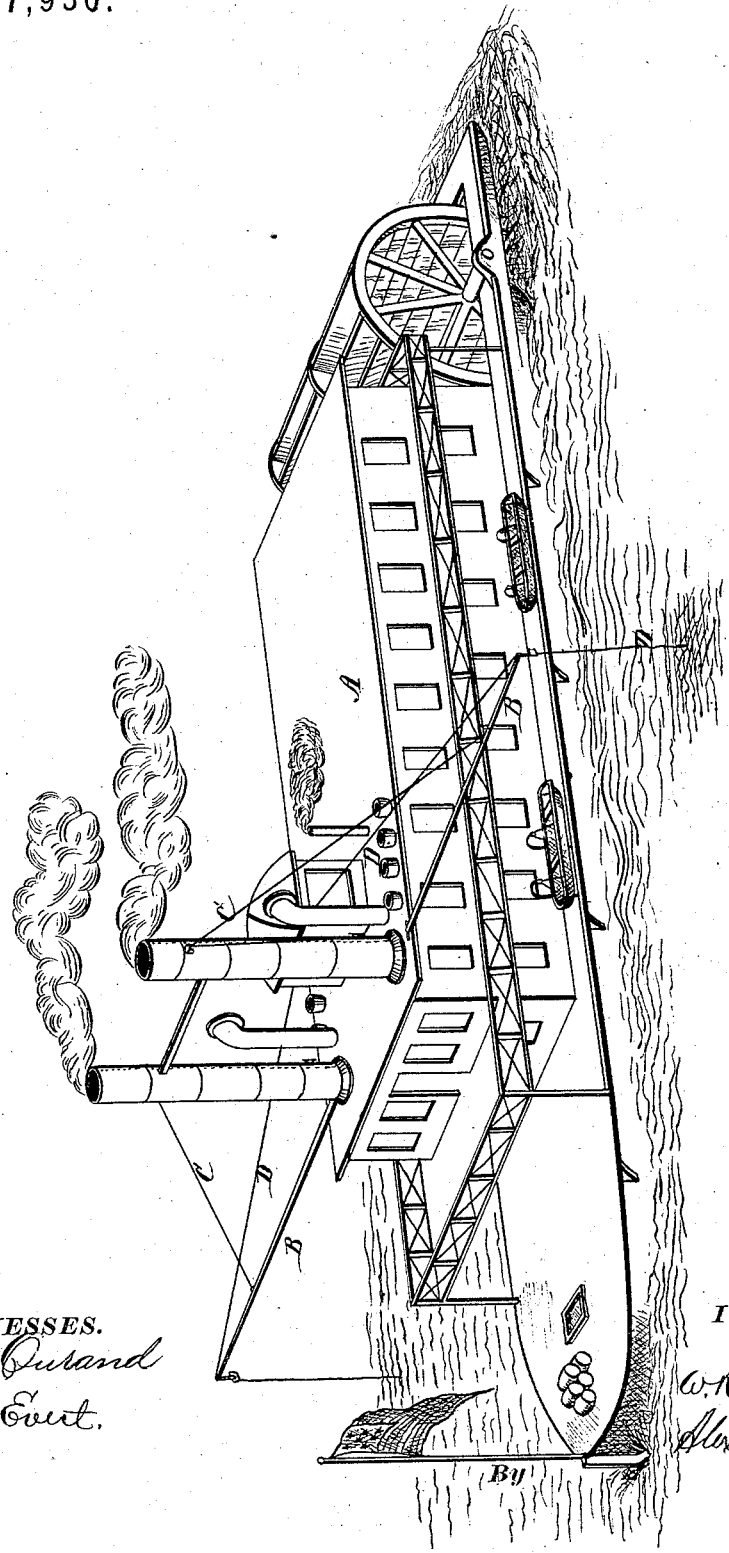

UNITED STATES PATENT OFFICE.

WILLIAM R. RIGHTOR, OF HELENA, ARKANSAS.

IMPROVEMENT IN SHOAL-INDICATORS.

Specification forming part of Letters Patent No. 157,930, dated December 22, 1874; application filed June 1, 1874.

*To all whom it may concern:*

Be it known that I, WILLIAM R. RIGHTOR, of Helena, in the county of Phillips and in the State of Arkansas, have invented certain new and useful Improvements in Navigation, styled Channel and Fog Guides; and do hereby declare that the following is a full, clear, and exact description thereof, reference being had to the accompanying drawings, and to the letters of reference marked thereon, making a part of this specification.

The nature of my invention consists in the employment of arms, which reach out from each side of the boat, similar to a jack-staff, and cords, which extend from the ends of these arms to the water, and to an index in the pilot-house, there being a buoy on one end of the cord and a counterpoise-weight on the other, for the purpose hereinafter described.

In the annexed drawings, making part of this specification, and which are perspective views, A represents the upper deck of any ordinary steamboat. B B represent two arms, which are made similar to a jack-staff, and which are hinged at one end to the top of the upper deck and near the smoke-stacks. Their outer ends extend over the sides of the boat, and at right angles to it. C C represent cords, which have one end connected to the arms near their outer ends, and then pass up over pulleys, which are secured to and near the upper ends of the smoke-stacks. The loose ends of these cords may remain on the deck or pass to the pilot-house, so that the arms may be raised to a perpendicular position when they are not in use, or be lowered to a horizontal position, when desirable. D D represent two cords, which have a buoy secured to one end, and a counterpoise-weight to the other. This counterpoise-weight is in the pilot-house, and the cord passes through a box, G, in which is a dial-plate. This dial-plate or wheel is operated by the cord, so that it will act as a guide or informer for the pilot. The buoys rest in the water. The cords pass through pulleys at the ends of the arms, so that they act freely.

When the current of the river acts upon the buoy the cord D is drawn through the box in the pilot-house sufficiently to act upon the index in said box, and thus indicate the channel. Should the index upon one side be moved by the buoy, and that upon the other not, then the pilot knows that he is not in the channel, and can steer accordingly. When the indexes are acted upon alike, then the pilot is assured that he is in the channel.

This is a very useful invention, especially in heavy fogs or dark nights, and may be used by inexperienced pilots, even in daylight and clear weather.

I am aware that devices for sounding the depth of water have been hitherto attached to various parts of steamboats; hence I do not broadly claim such as my invention.

What I claim, and desire to secure by Letters Patent, is—

In combination with a steamboat, the hinged arms B B, each having a pulley at its outer end, the ropes D D, each having a weight at both ends, and the boxes G G, with indicators, and arranged in the pilot-house, all substantially as and for the purposes set forth.

In testimony that I claim the foregoing I have hereunto set my hand this 5th day of May, 1874.

WILLIAM R. RIGHTOR.

Witnesses:
P. O. THIVEATT,
H. S. HORNOR.